(12) United States Patent
Duval et al.

(10) Patent No.: US 6,869,067 B2
(45) Date of Patent: Mar. 22, 2005

(54) SHEATH FOR A SUSPENSION SPRING

(75) Inventors: Philippe Duval, Lambres-Lez-Douai (FR); Roger Henri, Joinville (FR)

(73) Assignee: Allevard Rejna Autosuspensions, Saint Cloud (FR)

( * ) Notice: Subject to any disclaimer, the term of this patent is extended or adjusted under 35 U.S.C. 154(b) by 0 days.

(21) Appl. No.: 10/461,325

(22) Filed: Jun. 13, 2003

(65) Prior Publication Data

US 2004/0094879 A1 May 20, 2004

(30) Foreign Application Priority Data

Jun. 13, 2002 (FR) .............................. 02 07292

(51) Int. Cl.$^7$ .............................................. B60G 13/00
(52) U.S. Cl. ..................................... 267/220; 267/179
(58) Field of Search ........................ 267/33, 166, 169, 267/179, 287, 220; 188/321.11

(56) References Cited

U.S. PATENT DOCUMENTS 2,815,201 A * 12/1957 Girod-Eymery ............. 267/33
2,832,587 A * 4/1958 Robert ........................ 267/33
4,721,325 A * 1/1988 Mackovjak et al. .......... 267/33
4,732,372 A * 3/1988 Dickhart et al. ............ 267/287
5,299,786 A    4/1994 Godin
6,293,572 B1 * 9/2001 Robbins et al. ............... 267/33

FOREIGN PATENT DOCUMENTS

| EP | 0791491 | 8/1997 |
| FR | 1308763 | 11/1962 |
| FR | 2656052 | 6/1991 |

* cited by examiner

*Primary Examiner*—Robert A. Siconolfi
*Assistant Examiner*—Melanie Torres
(74) *Attorney, Agent, or Firm*—James Ray & Associates

(57) ABSTRACT

The invention relates to a spring suspension system comprising a helical spring, a sheath, and at least one centering and bearing cup, said spring having an end turn with at least a fraction thereof being covered by said sheath, and which is centered on and bears against said centering and bearing cup. The sheath presents an opening extending around the inner periphery of the sheath and facing towards the spring axis. The fraction of the end turn covered by the sheath is centered on and bears against the centering and bearing cup via spacer means between said sheath and said centering and bearing cup.

9 Claims, 3 Drawing Sheets

SHEATH FOR A SUSPENSION SPRING

The present invention relates to a spring suspension system comprising a helical spring, a sheath, and at least one centering and bearing cup, said spring having an end turn with at least a fraction thereof covered by said sheath and centered and bearing on said centering and bearing cup.

The invention applies in particular to the field of motor vehicles.

BACKGROUND OF THE INVENTION

The presence of a sheath surrounding at least a fraction of the last turn of the spring (the end turn) serves to avoid the spring making direct contact with the cup. Consequently, the noise coming from the end turn rubbing against the cup is attenuated and the vibration which can be transmitted to the rest of the vehicle is damped. In addition, the sheath serves to protect the end turn of the spring, in particular against corrosion which can arise in the vicinity of the contact between the end turn and the cup due to water and/or debris accumulating.

Spring suspension systems of this type are known comprising a tubular sheath covering the entire section of at least a fraction of the end turn. Nevertheless, such sheaths encourage water to condense, which can then penetrate inside the tube of the sheath and generally gives rise to corrosion of the turn. In addition, such a sheath is lengthy to mount since it needs to be threaded on via one of its ends.

Other spring suspension systems of this type are known comprising a sheath which presents an opening that enables the sheath to be fitted easily over the turn, while simultaneously avoiding water condensing around the entire section of the turn. Nevertheless, water and/or debris can accumulate in the bottom of the sheath, in particular for a bottom cup where the opening faces towards the top of the suspension system, and that leads to the turn being corroded.

In order to encourage removal of water and debris, sheaths are known in which the opening faces towards the outside of the spring. However, the turn is then exposed to being struck by chippings and that can damage the coating that is intended to protect the turn. In addition, it is difficult to mount such springs and to keep them in position since the outwardly-directed opening is contrary to the curvature of the spring.

OBJECT AND SUMMARY OF THE INVENTION

The object of the invention is to provide a spring suspension system having a sheath that is easy to mount and that allows water and debris to be evacuated naturally.

This object is achieved by the fact that said sheath presents an opening extending around the inner periphery of the sheath facing towards the spring axis, and by the fact that said fraction of the end turn covered by the sheath is centered on and bears against the centering and bearing cup via spacer means between said sheath and said centering and bearing cup.

The opening of the sheath facing towards the inside of the end turn makes it easier to put the sheath into place on the turn, which in addition does not tend to become separated therefrom.

In order to avoid any risk of water and/or debris accumulating between the end turn and the centering and bearing cup, the device presents spacer means preferably situated locally between the sheath and the centering and bearing cup. By making the spacer means in the form of discrete elements, the sheath covering the end turn can be spaced apart from the centering and bearing cup, such that water and debris cannot remain accumulated between them but is evacuated naturally, generally downwards.

In addition, the presence of the spacer means makes it possible to localize accurately the points of contact between the sheath and the centering and bearing cup.

Springs can thus be standardized, with only the spacer means needing to be modified.

The spacer means may be fitted to the cup and/or the sheath, for example by being overmolded thereon, or indeed the spacer means and the sheath may form portions of a single sheath-and-spacer piece.

Consequently, only this sheath-and-spacer piece needs to be adapted to the intended function (localized bearing, off-centering, right or left directions, etc . . . ), while the remainder of the device, and in particular the spring and the centering and bearing cup are standard.

Advantageously, said spacer means comprise radial spacer means suitable for holding the sheath at a distance from a centering face of the centering and bearing cup.

Consequently, it is simple to adapt the suspension device without needing to change the entire device, and in particular the spring can be positioned off-center very easily.

Advantageously, the radial spacer means comprise centering tabs extending between the sheath and the centering face of the centering and bearing cup.

It suffices to change the shape of the radial spacer means to change the centering of the sheath relative to the centering and bearing cup, and thus to change the centering of the spring. When the radial spacer means are formed on the sheath, a single type of spring can be off-center to a greater or lesser extent, depending on the type of sheath which covers its end turn.

Advantageously, the spacer means comprise axial spacer means suitable for holding the sheath at a distance from the bearing face of the centering and bearing cup.

Contact between the spring and the centering and bearing cup is then no longer continuous, taking place through points in the vicinity of each of the axial spacer means, thus making it possible to reduce noise due to the spring rubbing against the cup, and to avoid any rattling phenomenon.

Advantageously, the axial spacer means comprise bearing tabs extending between the sheath and the bearing face of the centering and bearing cup.

Consequently, the sheath is raised or lowered relative to the bearing face of the bottom or top centering and bearing cup, thereby making it correspondingly easier for water and debris to be evacuated. In addition, the bearing tabs may be located differently from one suspension system to another in order to confer differing properties thereto (right or left suspensions for a vehicle, etc.).

It will be understood that the spacer means may comprise both radial spacer means and axial spacer means. In addition, a centering tab and a bearing tab may optionally be superposed one above the other in the axial direction of the spring, thereby optionally forming a pair of centering and bearing tabs.

BRIEF DESCRIPTION OF THE DRAWINGS

The invention will be well understood and its advantages will appear more clearly on reading the following detailed description of embodiments given as non-limiting examples.

The description refers to the accompanying drawings, in which.

MORE DETAILED DESCRIPTION

Figure 1:
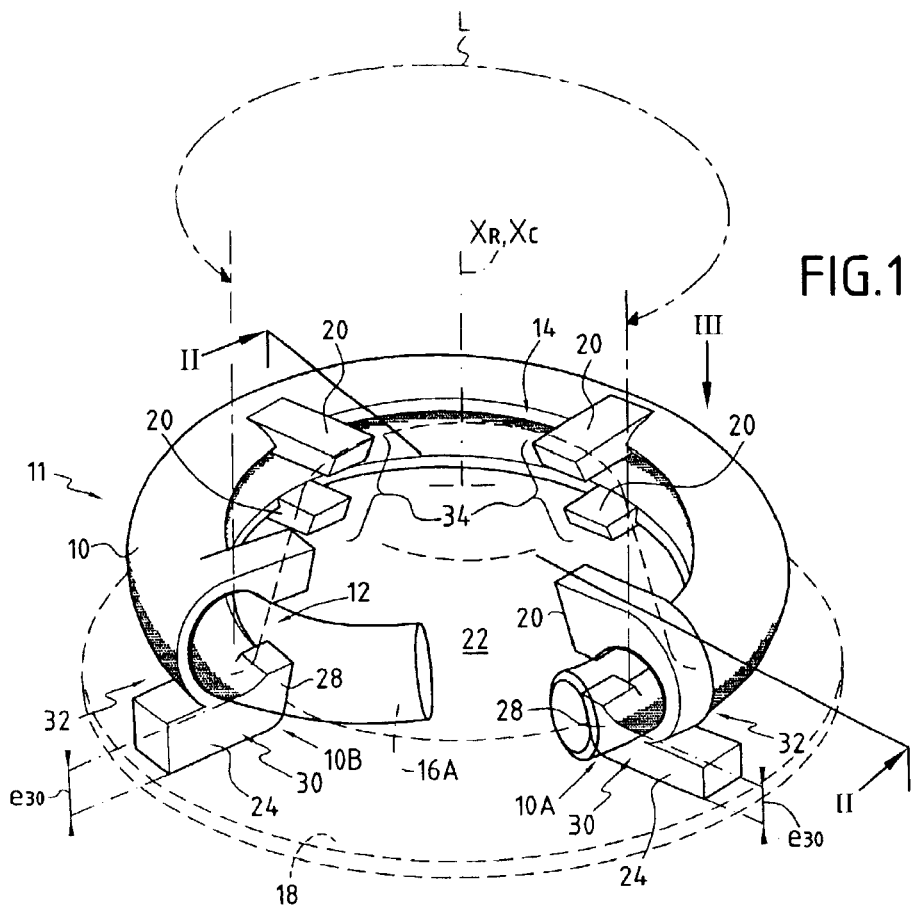
FIG. 1 is a perspective view of a sheath of the invention.

FIG. 1 shows a sheath 10 for covering at least a fraction of an end turn of a spring (drawn in chain-doted lines in FIG. 1), the sheath presenting an opening 12 that extends around the inner periphery 14 of the sheath 10.

The opening 12 is preferably substantially longitudinal and occupies the entire length L of said sheath 10. When the sheath 10 is placed on the end turn, it takes up a shape that is substantially helical.

Figure 2:
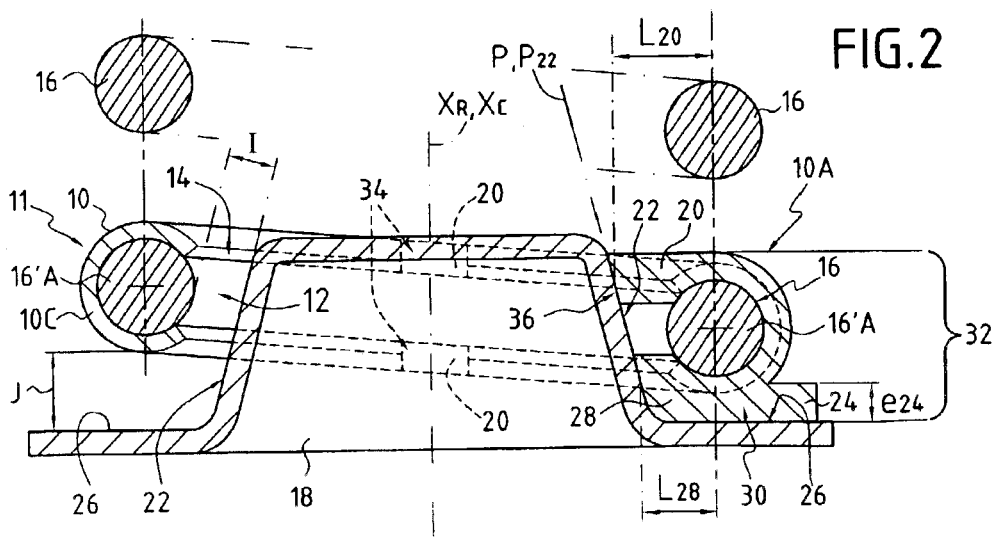
FIG. 2 is a section view on arrows II-II in FIG. 1 showing the sheath disposed on a centering and bearing cup.

Consequently, the sheath 10 is very easily mounted on a helical spring 16 in a spring suspension system by taking care to turn the opening 12 towards the axis $X_R$ of the spring, as shown in FIG. 2. It suffices to snap-fasten the sheath 10 onto the spring 16 in the vicinity of that fraction of the end turn 16'A that is to be covered, in order to ensure that the sheath is positioned and remains in place. Since the opening 12 faces towards the axis $X_R$ of the spring, the sheath 10 has a natural tendency to remain placed on the spring 16 surrounding the end turn 16A.

Spacer means which are preferably formed directly on the sheath 10 so as to constitute a single sheath and spacer piece 11, e.g. made by molding or injection of plastic material, elastomer, etc., enable the fraction of the end turn 16'A that is covered by the sheath 10 to be centered on and to bear against a centering and bearing cup 18 (see FIG. 2).

Specifically, the spacer means comprise firstly radial spacer means 20 suitable for holding the sheath 10 at a distance from a centering face 22 of the centering and bearing cup 18, and secondly axial spacer means 24 suitable for holding the sheath 10 at a distance from a bearing face 26 of the centering and bearing cup 18.

The radial spacer means 10, specifically centering tabs, extend between the sheath 10 and the centering face 22 of the centering and bearing cup 18. These centering tabs 20 are advantageously formed directly on the sheath 10 and are turned towards the axis $X_R$ of the spring 16 in such a manner as to bear against the centering face 22 whose axis of symmetry $X_C$ coincides with said axis $X_R$, such that centering takes place radially around the axis $X_R$ of the spring 16 (or the axis $X_R$ of the centering and bearing cup 18).

The axial spacer means 24, specifically bearing tabs, extend between the sheath 10 and the bearing face 26 of the centering and bearing cup 18. Depending on the desired suspension system, these bearing tabs 24 may be distributed to a greater or lesser extent around the inner periphery 14 of the sheath 10. When in position on the suspension system, bearing takes place substantially parallel to the axis $X_R$ of the spring 16.

As shown in FIG. 1, these bearing tabs 24 may present respective transverse extensions 28 in the vicinity of an end 10A of the sheath 10, said transverse extensions being suitable for co-operating with the centering face 22 so as to form a centering and bearing tab 30. This transverse extension 28 is analogous to a centering tab 20, such that centering and bearing tabs 30 serve simultaneously to hold the sheath 10 apart from the centering face 22 and from the bearing face 26.

At least one of the centering tabs 20 and one of the bearing tabs 24 are preferably superposed in an axial direction of the spring 16 so as to form a centering and bearing tab pair 32 occupying both sides of the opening 12. When the centering and bearing cup 18 is a bottom cup, as shown in FIG. 2, then the centering tab 20 is placed above the bearing tab 24. The opposite configuration is adopted when the centering and bearing cup is a top cup.

Throughout the description below, it is assumed that the cup being described is a bottom cup so that terms like "beneath" and "bottom" relate to a zone closer to the bearing face of the centering and bearing cup. It follows that the elements described are the same for a centering and bearing cup that is a top cup, but in a configuration that is the opposite way up.

Specifically, the sheath shown in FIG. 1 has two centering and bearing tab pairs 32 occupying opposite sides of the opening 12, and located at respective opposite ends 10A and 10B of the sheath.

Furthermore, at least one of the centering tabs 20 is disposed above another centering tab 20 in an axial direction of the spring 16 so as to form a pair of centering tabs 34 extending on either side of the opening 12.

In order to ensure that the spring is properly centered and bears properly against the centering and bearing cup 18, the width of each of the centering tabs 20 and of each of the bearing tabs 24 is a curvilinear length l lying in the range 4 millimeters (mm) to 40 mm, and preferably in the range 8 mm to 15 mm.

Figure 3:
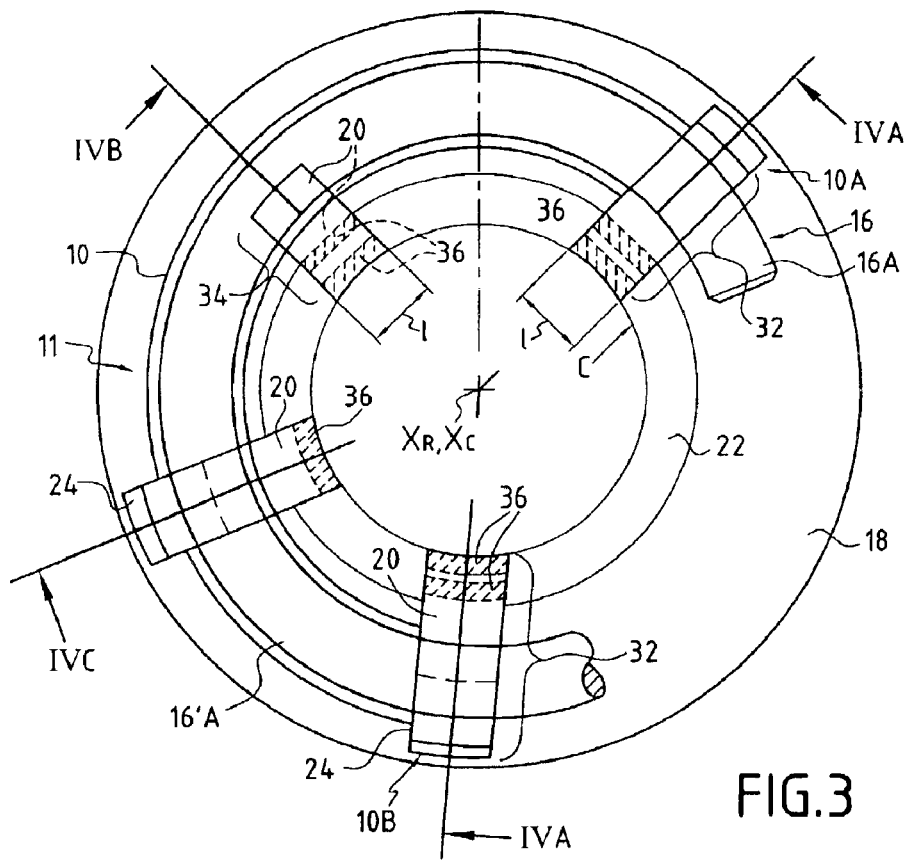
FIG. 3 is a plan view seen looking along direction III of FIG. 1.

The shapes of the centering tabs 20 and of the centering and bearing tabs 30 are preferably matched to the outline of the centering face 22 against which they come to bear. Thus, as shown in FIG. 3, the centering tabs 20 and the centering and bearing tabs 30, may present curvature C analogous to the curvature of the centering face 22.

In addition, when the centering face 22 of the centering and bearing cup 18 is inclined relative to the axis $X_C$, as shown in FIG. 2, the centering zone 36 of the sheath 10, i.e. on each of the centering tabs 20 and on each of the centering and bearing tabs 30, may present a slope P relative to the axis $X_C$ that is analogous to the slope $P_{22}$ at which the centering face 22 is inclined.

Figure 4A:
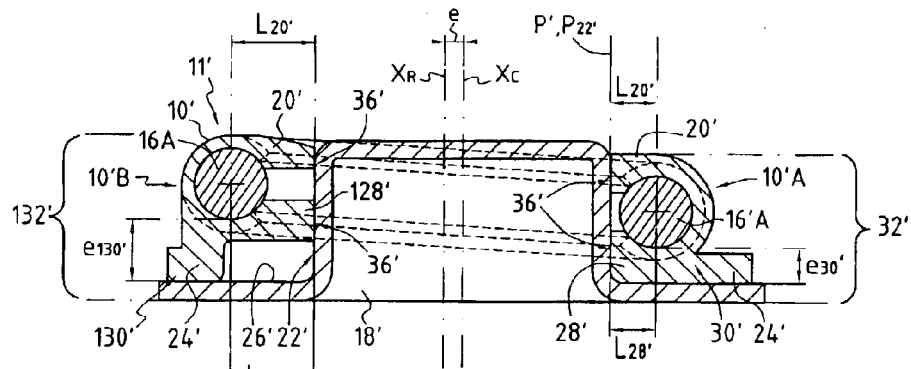
FIG. 4A is a section view on arrows IVA-IVA of FIG. 3 showing a variant sheath disposed on a centering and bearing cup.

Alternatively, when the centering face 22' of a centering and bearing cup 18' extends substantially parallel to the axis X of the spring 16, as shown in FIG. 4A, the slope P' of the centering zone 36' of each centering tab 20' and of each centering and bearing tab 30' is nil since the slope $P_{22'}$ of the centering face 22' is nil. Under such circumstances, the centering zone 36' of the sheath 10' is substantially parallel to the axis $X_C$, and the centering face 22' at the bearing face 26' of the centering and bearing cup 18 is substantially transverse.

In addition, as shown in FIG. 2, the centering tabs 20, the bearing tabs 24, and the centering and bearing tabs 30 may be spaced differently from one sheath to another, depending on the type of suspension system that is desired, and this applies regardless of the type of centering and bearing cup involved.

For ordinary centering and bearing cups, the number $N_{24}$ of bearing tabs 24 and the number $N_{20}$ of centering tabs 20 are preferably both in the range 2 to 20, so that the curvilinear spacing between two successive tabs around the turn enables the spring to be centered and to bear in stable manner against the centering and bearing cup.

As a consequence of the above-specified dispositions for the tabs, accumulation of water and debris is avoided or at least limited since water and debris are easily removed by being evacuated through the gaps I and J that exists between the sheath 10 and the cup 18, respectively beside the centering face 22 and beside the bearing face 26.

At locations where the sheath and spacer piece 11 does not present a (centering and/or bearing) tab, neither the turn 16'A nor the sheath 10 comes directly into contact with the centering and bearing cup 18, whether with the bearing face 26 or with the centering face 22, and the gaps I and J allow water and debris to be evacuated. The cross-section 10C of the sheath 10 is preferably C-shaped with the opening 12 of the C-shape facing towards the inside of the end turn 16A, i.e. towards the axis $X_R$ of the spring 16.

The width of the gap I which corresponds to the distance between the sheath and the centering face of the cup is advantageously not less than 2 mm and preferably lies in the range 4 mm to 10 mm. The height of the gap J corresponding to the distance between the sheath and the bearing face of the cup is advantageously not less than 2 mm and may increase along the turn because of the slope of the turn relative to the bearing face.

Depending on whether it is desired to center the spring 16 or to have the spring off-center relative to the axis $X_C$, the length of the centering tabs and the length of the transverse extensions may either be constant from one tab to the next, or on the contrary may vary in order to enable the end turn 16A to be off-center.

Thus, when the spring 16 is centered symmetrically about the axis $X_C$ of the centering face 22 of the centering and bearing face 18, i.e. when the axis $X_C$ coincides with the spring axis $X_R$ (see FIG. 3), the length $L_{20}$ of the centering tabs 20 and the length $L_{28}$ of the transverse extensions 28 is constant from one tab to another. In addition, when the centering and bearing cup 18' presents a centering face 22' parallel to the axis $X_R$ of the spring 16, the length $L_{20}$ of the centering tabs 20 and the length $L_{28}$ of the transverse extensions 28 are constant from one tab to another ($L_{20}$ is substantially equal to $L_{28}$).

Conversely, when the spring is off-centered relative to the axis $X_C$ of the centering and bearing cup 18, i.e. when said axis is offset by eccentricity e relative to the spring axis $X_R$ (see FIG. 4A), then the length $L_{20'}$ of the centering tabs 20' and the length $L_{28'}$ of the transverse extensions 28' varies from one type of tab to the other with the tabs situated on the side where the eccentricity is positive being shorter than the others. Thus, for example, the top centering tab 20' situated in the vicinity of the end 10'A of the turn 16 is shorter than the centering tab 120' situated in the vicinity of the end 10'B ($L_{20'}<L_{120'}$). The same applies to the transverse extensions 28' and 128' respectively situated in the vicinity of the end 10'A and in the vicinity of the end 10'B.

Furthermore, in order to hold the turn spaced apart from the bearing face 26 while compensating for the difference in height due to the helical shape of the spring 16, the bearing tabs 24', and more particularly the centering and bearing tabs 30' are of respective thicknesses that increase between successive tabs on going away from the bearing face 26 following the end turn 16A.

Thus, the bottom tabs may be of different types.

The bottom centering tabs may bear against the bearing face 26' of the centering and bearing cup 18' so as to form a centering and bearing tab 30' or 130' which, in combination with a top centering tab 20', forms a centering and bearing pair of tabs 32' or 132', as shown in FIG. 4A.

Under such circumstances, the centering and bearing tab 30' may be a single piece (right-hand side of FIG. 4A), for example beside the nearer side of the centering and bearing cup 18', in particular in the vicinity of the end 10'A, or it may be shaped to avoid any risks of excessive friction between the sheath 10' and the centering and bearing tabs 18' and to save on the amount of material used.

Thus, when the extension becomes too thick to compensate for the height difference of the end turn 16'A, provision can be made for said extension 128' to be solely in a shape analogous to a centering tab 20', so that the bearing tab 124' does not come directly into contact with the centering face 22', but only via said extension 128'; the bearing area of the bearing zone 36' is thus greatly limited.

Consequently, the centering and bearing tab 130' close to the remoter end 10'B of the bearing face 26' of the centering and bearing cup 18' is formed by two branches constituting respectively the bearing tab 124' and the centering tab 128', a gap being left between the bearing tab 124' and the centering face 22', and between the centering tab 128' and the bearing face 26' (left-hand side of FIG. 4A), whereas this gap does not exist for the centering and bearing tab 30'.

Figure 4B:
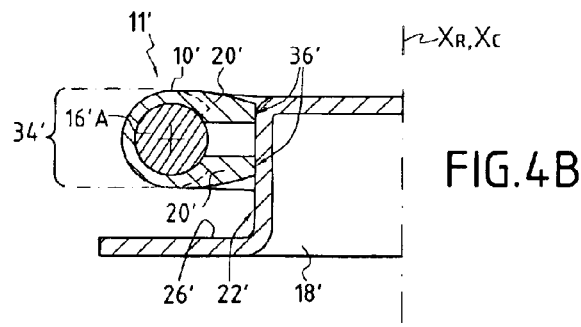
FIG. 4B is a section view on arrows IVB-IVB of FIG. 3, showing a variant of the spacer means.

The bottom centering tabs need bear against only the centering face 22', as shown in FIG. 4B, thereby forming a pair of centering tabs 34'.

Figure 4C:
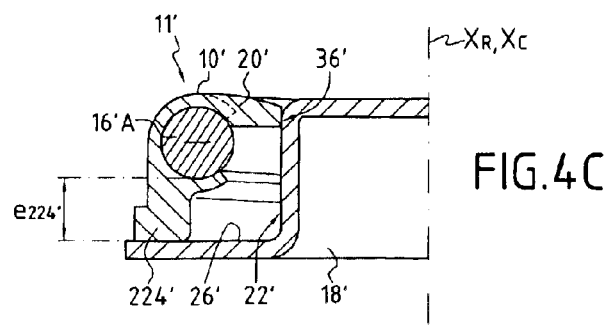
FIG. 4C is a section view on arrows IVC-IVC of FIG. 3 showing another variant of the spacer means.

Similarly, the bottom tab may be formed solely by a bearing tab 224' of thickness $e_{224}$, increasing with increasing distance of the tab from the bearing face 26' of the centering and bearing cup 18'. A centering tab 20' may be disposed above said bottom bearing tab 224', as shown in FIG. 4C.

It will be understood that all combinations are possible between the various shapes and the various types of tab as described above (centering tab, bearing tab, centering and bearing tab, pair of tabs, tabs above each other or not, etc. . . . ).

The same variants can be envisaged when the centering and bearing cup 18 has a centering face 22 that is inclined. For example, as shown in FIG. 1, the two centering and bearing tabs 30 forming a single piece present thicknesses $e_{30}$ that differ from one tab to the other, so as to compensate for the difference in height of the end turn 16A (shown in chain-doted lines) from one end 10A to the other 10B. Thus, the thickness $e_{30}$ of the centering and bearing tab 30 at the end 10B of the sheath 10 is greater than the thickness $e_{30}$ of the centering and bearing tab 30 at the opposite end 10A of the sheath 10.

Figure 5:
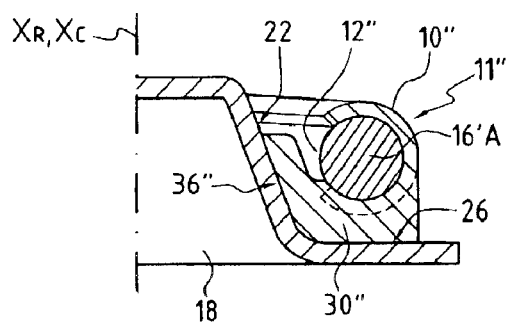
FIG. 5 is a fragmentary section view of a variant sheath placed on a centering and bearing cup.

FIG. 5 shows another variant of a sheath 10" which comprises, for a bottom centering and bearing cup, bottom centering and bearing tabs 30" that are not disposed beneath a top centering tab. These centering and bearing tabs 30' distributed around the sheath 10", may present varying shapes and thicknesses from one centering and bearing tab to another depending on distance from the end turn 16A, and in particular the centering zone 36" and the opening 12" may be of different shapes from one sheath 10" to another or on a given sheath 10", so as to center the spring in different manners relative to the centering face 22, and/or so as to have differ spacings relative to the bearing face 26.

This type of sheath 10" that does not present a top centering tab placed above a centering and bearing tab 30" serves to limit the amount of debris and water that penetrates into the vicinity of the tab 30", and care is taken to ensure that the curvilinear width of these centering and bearing tabs 30" is shorter. Consequently, any debris which does accumulate locally is easily removed from each side of each of said centering and bearing tabs 30" between the sheath 10" and the cup 18.

What is claimed is:

1. A spring suspension system comprising a helical spring, a sheath, and at least one centering and bearing cup, said spring having an end turn with at least a fraction thereof being covered by said sheath, and which is centered on and bears against said centering and bearing cup;

wherein said sheath presents an opening extending around the inner periphery of the sheath facing towards the spring axis;

wherein said fraction of the end turn covered by the sheath is centered on and bears against the centering and" bearing cup via spacer means between said sheath and said centering and bearing cup;

wherein said spacer means comprise radial spacer means suitable for holding the sheath at a distance from the centering face of the centering and bearing cup; and wherein said radial spacer means comprise centering tabs extending between the sheath and the centering face of the centering and bearing cup.

2. A spring suspension system according to claim 1, wherein said spacer means comprises axial spacer means suitable for holding the sheath at a distance from a bearing face of the centering and bearing cup.

3. A spring suspension according to claim 2, wherein said axial spacer means comprise bearing tabs extending between the sheath and the bearing face of the centering and bearing cup.

4. A spring suspension system according to claim 3, wherein at least one of said bearing tabs presents a transverse extension suitable for co-operating with a centering face of the centering and bearing cup, thereby forming a centering and bearing tab.

5. A spring suspension system according to claim 3, wherein said radial spacer means comprise centering tabs extending between the sheath and the centering face of the centering and bearing cup, and wherein at least one of the centering tabs and at least one of the bearing tabs are superposed in an axial direction of the spring to form a centering and bearing pair of tabs extending on either side of the opening.

6. A spring suspension system according to claim 1, wherein at least one of the centering tabs is disposed above another one of the centering tabs in an axial direction of the spring to form a pair of centering tabs; extending on either side of the opening.

7. A spring suspension system according to claim 3, wherein said bearing tabs present thicknesses that increase going away from the bearing face following the end turn.

8. A spring suspension system according to claim 1, wherein the spacer means are suitable for fitting to the centering and bearing cup and/or to the sheath.

9. A spring suspension system according to claim 1, wherein said spacer means and said sheath form portions of a single spacer and sheath piece.

* * * * *